Patented Feb. 27, 1951

2,543,211

UNITED STATES PATENT OFFICE 2,543,211

AQUEOUS DISPERSION OF A PIGMENTED ALKYD RESIN

William A. Waldie, Dayton, Ohio, assignor to The Commonwealth Engineering Company of Ohio, Dayton, Ohio, a corporation of Ohio No Drawing. Application February 28, 1947, Serial No. 731,717

4 Claims. (Cl. 260—22)

This invention deals with alkyd resin coating compositions, and in particular with aqueous dispersions thereof.

It is an object of this invention to provide coating compositions which are easy to apply and are extremely fast drying.

The essence of this invention consists broadly in adding an aqueous mixture to conventional alkyd resins and emulsifying said mixture.

The pigmented alkyd resins preferred for the composition of this invention are prepared by saponifying an oil or fatty oil acid and adding a pigment suspended in water. This suspension is then acidified whereby the pigment coated with the acids of the oil is precipitated. This precipitate is then separated from the water and added to a reaction product of glycerin and phthalic anhydride which has been previously prepared in a separate batch.

To this product just described, there is then added a mixture containing the following ingredients.

10 to 15 lbs. ethylene glycol monoethyl ether
3 to 6 lbs. casein
¼ to ½ gal. ammonia water
6 gals. water The entire mixture is then thoroughly emulsified whereupon it is ready for use. However, more water may be added if a lower viscosity is desired. This is mainly dependent upon the method of application, a thinner consistency for instance being required if spraying is to be used than if the coating composition is to be applied by brushing.

The pigments which may be used in producing the pigmented fatty acid gels and which are subsequently reacted to form the pigmented alkyd resin are those which do not react chemically with the materials employed in the production of the pigmented gel and pigmented alkyd resin. Suitable pigments include lithopone, carbon black, titanium oxide, the chromium greens, ultramarine blue, iron oxides, etc. The quantity of the pigment used depends on the intensity of its color and upon the deepness of the color desired of the final coating.

While the process of my invention has been described in connection with pigmented alkyd resins, it will be understood that other alkyd resins may be used just as well and that the invention is not limited with regard to the alkyd resin. Drying, semi-drying or non-drying oils or their acids are satisfactory; however, linseed oil, soya bean oil and cottonseed oil have been found particularly advantageous.

In the following, an example is given for a method and the ingredients which yielded particularly satisfactory results.

Example 22 lbs. of linseed oil are saponified by adding approximately 3.25 lbs. of caustic soda dissolved in about 20 gallons of water. The mixture of oil and caustic solution is boiled for a time sufficient to completely saponify said oil. 15 to 30 minutes is generally sufficient. Thereafter 40 lbs. of lithopone are added as a water suspension using 10 gallons of water, and the batch is boiled for approximately 1 hour. To the resulting reaction mixture there is then added approximately 5.5 lbs. of acetic anhydride whereby the soap previously formed is converted into the fatty oil acid which coats the pigment. The pigment coated with the fatty acids precipitates; this precipitate is removed from the water.

In a separate batch 23.5 phthalic anhydride and 11.75 lbs. of glycerin are heated to 400° F. until the mixture is homogeneous. The precipitate comprising pigmented fatty acid is then added to this mixture which is then kept at approximately 450° F. until the reaction has proceeded to the degree desired. Thereafter, another 18 lbs. of heat bodied linseed oil of a viscosity of Z-4 is added and the mixture once more heated to a temperature of approximately 500° F. until homogeneous. The mixture is then allowed to cool to about 250° F., whereafter a mixture is added consisting of 12 lbs. of ethylene glycol monoethyl ether, 4½ lbs. of casein, ⅜ gal. of ammonia water and 6 gallons of water. This final mixture is then emulsified in a suitable device whereupon it is ready for use.

While in the foregoing example phthalic anhydride has been used, it will be understood that phthalic acid as well as maleic acid, maleic anhydride and other polybasic acids and their anhydrides may be used in the practice of my invention depending upon the nature of the resin desired.

Likewise, while acetic anhydride has been used as the acidifying agent to precipitate the fatty acids and pigment from the saponified mass, it will be understood by those skilled in the art that any other suitable dilute inorganic or organic acid may be employed such as, for example, $\frac{1}{10}$ N hydrochloric acid.

It will be further understood that while caustic soda has been used in the example, any other saponifying agent producing soluble soap may be employed in place thereof, and that other polyhydric alcohols may be used in place of glycerin.

It will be furthermore understood that mixtures of pigments, as well as mixtures of different oils and mixtures of different fatty acids, and mixtures of fatty acids and oils may be used in the practice of my invention.

It will also be understood that while there have been described herein certain specific embodiments of my invention, it is not intended thereby to have it limited to or circumscribed by the specific details given in view of the fact that this invention is susceptible to various modifications and changes which come within the spirit of this disclosure and the scope of the appended claims.

I claim:

1. In a method of preparing a coating composition in the form of an emulsion, the steps of forming an alkyd resin by the reaction of glycerin with a compound selected from the group consisting of phthalic acid, maleic acid, phthalic anhydride and maleic anhydride, and during polymerization mixing into the reaction product a fatty acid coated pigment, heating the mixture to approximately 450° F. to react the fatty acid with the alkyd resin, said fatty acids, pigment and resin being present in the proportion by weight of approximately 1:2:2, adding to the pigmented resins an aqueous mixture of ethylene glycol monoethyl ether and casein, agitating the mixture to emulsify and to disperse the pigmented resin when said mixture is at a temperature of approximately 250° F.

2. In a method of preparing a coating composition in the form of an emulsion, the steps of mixing at a temperature of approximately 450° F. fatty acids coated pigment obtained by precipitating the acids of 22 pounds of fatty oil on 40 pounds of pigment with alkyd resin prior to completion of polymerization whereby the fatty acid is reacted with the resin said resin being obtained by reacting 11.75 pounds of glycerin and 23.5 pounds of phthalic anhydride and 18 pounds of fatty oil, adding to the cooled mixture an aqueous medium consisting of from 10 to 15 pounds of ethylene glycol monoethyl ether, from 3 to 6 pounds of casein, from ¼ to ½ gallon of ammonia water and approximately 6 gallons of water; and agitating the mixture to effect dispersion of the alkyd vehicle and incorporated pigment in the casein vehicle when said mixture is at a temperature of approximately 250° F.

3. In a method of preparing a coating composition in the form of an emulsion, the steps of mixing at a temperature of approximately 450° F. fatty acids coated pigment obtained by precipitating the acids of 22 pounds of linseed oil on 40 pounds of lithopone with alkyd resin prior to completion of polymerization whereby the fatty acid is reacted with the resin said resin being obtained by reacting 11.75 pounds of glycerin and 23.5 pounds of phthalic anhydride, 18 pounds of linseed oil of a viscosity of approximately Z-4, and adding an aqueous medium consisting of 12 pounds of ethylene glycol monoethyl ether, 4½ pounds of casein, ⅜ gallon of ammonia water and 6 gallons of water; and agitating the mixture to effect dispersion of the alkyd vehicle and incorporated pigment in the casein vehicle when said mixture is at a temperature of approximately 250° F.

4. In a method of preparing a coating composition in the form of an emulsion, the steps comprising reacting vegetable oil with an alkali to form a soluble soap, mixing a pigment non-reactive with the materials employed in the production of the pigmented gel in the form of an aqueous suspension into said soap thoroughly to coat the particles of pigment therewith, acidifying the mixture to precipitate a pigmented fatty acid gel, said fatty acids uniformly coating said pigment, removing the water which separates out, adding the pigment coated with vegetable oil fatty acid to the heat reaction product of glycerin and a compound selected from the group consisting of phthalic acid, maleic acid, phthalic anhydride and maleic anhydride and heating to approximately 450° F. to react the fatty acid with the reaction product said faty acids pigment and resin being present in the proportion by weight of approximately 1:2:2, cooling the mixture to about 250° F. adding to the pigmented resin an aqueous mixture of ethylene glycol monoethyl ether and casein, and agitating the mixture to emulsify and to disperse the pigmented resin.

WILLIAM A. WALDIE.

REFERENCES CITED

The following references are of record in the file of this patent:

UNITED STATES PATENTS

| Number | Name | Date |
|---|---|---|
| 2,388,301 | Waldie | Nov. 6, 1945 |
| 2,440,953 | Iliff et al. | May 4, 1948 |

FOREIGN PATENTS

| Number | Country | Date |
|---|---|---|
| 349,903 | Great Britain | May 27, 1931 |

OTHER REFERENCES

Official Digest Nov. 1945, page 417.